United States Patent

O'Malley et al.

[15] 3,678,783
[45] July 25, 1972

[54] POWER TRANSMISSION

[72] Inventors: John J. O'Malley, Livonia, Mich.; Marion D. Smith, Indianapolis, Ind.

[73] Assignee: General Motors Corporation, Detroit, Mich.

[22] Filed: June 1, 1970

[21] Appl. No.: 41,928

[52] U.S. Cl. ............................ 74/759, 74/15.82, 74/763, 74/765
[51] Int. Cl. ............................. F16h 57/10, B60k 17/28
[58] Field of Search ........................ 74/765, 759, 763

[56] References Cited

UNITED STATES PATENTS

| | | | |
|---|---|---|---|
| 2,251,625 | 8/1941 | Hale | 74/759 X |
| 2,838,960 | 6/1958 | Simpson | 74/759 |
| 2,856,794 | 10/1958 | Simpson | 74/763 |
| 2,929,271 | 3/1960 | Miller | 74/759 |
| 2,929,272 | 3/1960 | Miller | 74/759 |
| 2,961,889 | 11/1960 | Granryd | 74/790 X |
| 3,482,469 | 12/1969 | Mori | 74/759 X |

Primary Examiner—Carlton R. Croyle
Assistant Examiner—Thomas C. Perry
Attorney—W. E. Finken, A. M. Heiter and Charles R. White

[57] ABSTRACT

The torque converter is operatively connected to first and second planetary gearsets forming a front drive unit controlled by a plurality of friction-drive-establishing devices to produce three forward and one reverse drive. The front gear unit is drivingly connected to third and fourth planetary gearsets forming a rear unit controlled by a plurality of friction-drive-establishing devices to produce at least three different speed ratios in the rear unit. The units can be combined to provide a large overall ratio change and a large selection of relatively, evenly-steeped, forward ratios between the lowest and the highest ratio. By providing for reverse gear in the front gear unit, a plurality of reverse drive ratios can be obtained by changing the gear ratio of the rear unit.

4 Claims, 2 Drawing Figures

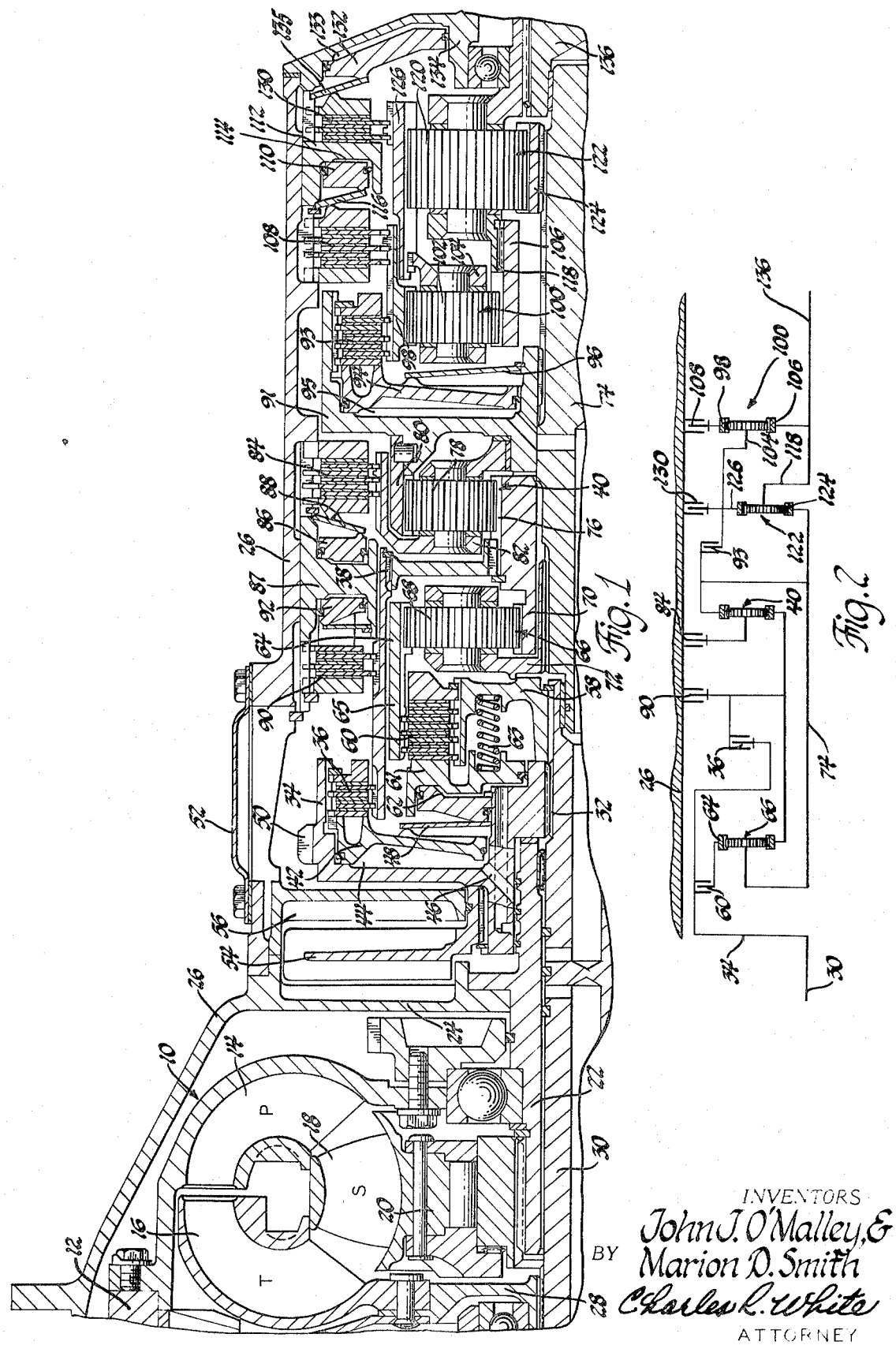

POWER TRANSMISSION

This invention relates to power transmissions and more particularly to a planetary gear type transmission providing high efficiency with a wide ratio coverage and a large selection of ratios with highly useful steps between the ratios.

This invention is particularly useful in a working vehicle having low-power-to-weight ratios such as a truck since it offers a large number of input/output speed ratios and makes full use of limited engine power available to meet varied load conditions. For smooth operation this invention provides for small, relatively even steps between the ratios. In this invention maintenance of power flow during gear changes is achieved by employing friction-drive-establishing devices to control a compact arrangement of planetary gear units. A fluid, torque-transmitting unit is employed to provide for torque multiplication and to absorb shock or jerks which often appear in high inertia vehicles. This transmission has a planetary front unit providing three forward and one reverse drive and a rear planetary unit providing three different ratios to produce overall nine forward drives and three reverse drives. In low range when torque requirements are high, there is a dual path drive through the components of the front unit allowing lighter and more economical construction of that unit.

In addition to the above, it is an object to provide a new and improved transmission having a front, compound planetary unit providing a plurality of forward drives and one reverse drive which operate in connection with a rear planetary unit providing a plurality of different speed ratios to produce a large number of overall forward and reverse ratios with small, relatively even steps between the ratios.

Another object of this invention is to provide a new and improved hydraulically driven transmission having a compound, front planetary unit which provides dual power paths when the unit is in low speed drive so that the front gear unit can be smaller and lighter in construction as compared to the rear unit.

Another object of this invention is to provide a wide ratio transmission having front and rear planetary units controlled by a plurality of selectively-engageable friction-drive-establishing devices to provide for full-power shifting between a plurality of transmission input/output ratios and in which the rear planetary unit is formed by a pair of planetary gearsets operatively connected in a new and improved manner to provide for three different speeds.

These and other objects of the invention will become more apparent from the following detailed description and drawing in which:

FIG. 1 is a side elevational view partly in section of the upper portion of a transmission illustrating a first embodiment of this invention.

FIG. 2 is a diagrammatic view of a transmission illustrating a second embodiment of this invention.

As illustrated in FIG. 1, there is a hydrodynamic torque converter 10 having a converter housing 12 driven by an engine, not shown. The housing is drivingly connected to a bladed, rotatable pump 14. The converter has a rotatable, bladed turbine 16 and has a stator 18 mounted for rotation in one direction on a one-way brake 20. This brake has an inner race splined to a ground sleeve 22 that is securely connected to an interior wall 24 of a transmission housing 26.

The turbine 16 is drivingly connected to a flange 28 that is splined to a power-transmitting shaft 30 which extends through the ground sleeve 22 and is connected by splines 32 to an annular drum 34 which houses a multi-plate friction clutch 36 that is engageable to drivingly connect the drum 34 to the outer cylindrical portion of a drum 38 which is drivingly connected to planetary gearsets 40 and 66.

Drum 34 houses a hydraulically actuatable piston 42 which cooperates with the drum to form a pressure chamber 44 between the piston and the support wall of the drum which is hydraulically connected by passage 46 to a suitable hydraulic control, not shown. A Belleville return spring 48 seated on the hub of drum 34 contracts and exerts a force on piston 42 urging it toward a clutch-release position. Drum 34 has a power take-off gear 50 formed on its outer periphery which is readily accessible upon removal of a cover plate 52 held on the transmission housing by suitable fasteners.

Splined to a forwardly extending shoulder of the drum 34 is hydrodynamic brake rotor 54 operatively disposed in a chamber 56 in the transmission housing. This chamber can be selectively filled with fluid so that the brake rotor 54 rotating in the fluid can provide braking effort to retard vehicle motion, if needed. Also splined to the drive shaft 30 is a hub member 58 which supports the drive plates of a multi-plate friction clutch 60. A hydraulically actuated piston 61 supported by interior shoulder construction of drum 34 effects the drive engagement of clutch 60 in response to a control pressure being delivered to the control chamber 62. Coil spring 63 disposed between the piston and hub member 58 urges the piston to a clutch release position when chamber 63 is exhausted.

Clutch 60 has driven plates splined to the internal portion of an extension 65 projecting forwardly from ring gear 64 of a planetary gearset 66. This gearset has planet gears 68 that mesh with this ring gear as well as a sun gear 70. The planet gears are rotatably mounted on a carrier 72 which is splined to an axially-extending, intermediate, power-transmitting shaft 74 that is piloted in the end of the shaft 30.

The sun gear 70 is drivingly connected to a sun gear 76 of the planetary gearset 40. This gearset has planet gears 78 which mesh with the sun gear 76 and with a ring gear 80. The planet gears are mounted on a carrier 82 which has an annular shell portion surrounding ring gear 80 with external splines supporting the friction plates of a multi-plate friction brake 84. Sandwiched between these drive plates are additional plates which are splined to the wall of the housing 26. Brake 84 is engaged in response to movement of the hydraulically actuated piston 86 slidably mounted in an annular piston housing 87. The piston acts through Belleville spring 88 to retard rotation of the carrier 82 to condition the gearing for predetermined operation as will be further explained below.

The sun gears 70 and 76 may be held for reaction by application of a multi-plate brake 90. This brake is engaged by hydraulically actuated piston 92, movably mounted in piston housing 87 to connect drum 38 to the housing 26. A return spring member engages this piston to provide a release force to urge it to a released position when the apply chamber for this piston is exhausted.

The ring gear 80 of planetary gearset 40 is drivingly connected to a drum 91 which has a hub portion splined to the intermediate shaft 74. Drum 91 houses a multi-plate friction clutch 93 and a hydraulically operated piston 94. The piston cooperates with drum 91 to form a pressure chamber 95 suitably connected to hydraulic controls. When the pressure chamber 95 is charged with pressure fluid from controls, the piston 94 moves to effect the torque transmitting engagement of the multi-plate clutch 93. A Belleville return spring 96 supported on the hub portion of drum 91 has peripheral contact with the piston to urge it to the clutch release position. The friction clutch 93 has driven plates splined to ring gear 98 of a planetary gearset 100. This gearset has planet gears 102 rotatably mounted on carrier 104 which mesh with the ring gear 98 and with a sun gear 106.

To selectively hold the ring gear 98 for reaction, there is a multi-plate friction brake 108 for connecting this ring gear with the transmission housing 26. This brake is operated by a hydraulically actuated piston 110 mounted in a support 112 fixed within the transmission housing 26. The piston will move forwardly upon supply of an actuating pressure to apply chamber 114 and act through the Belleville spring 116 to effect engagement of brake 108.

The sun gear 106 of planetary gearset 100 is splined to a carrier 118 for planetary gears 120 of a rear planetary gearset 122. This rear gearset has a sun gear 124 splined to the intermediate shaft 74 and has a ring gear 126 which is drivingly connected to the carrier 104 of the planetary gears 102 of gearset 100. To selectively hold ring gear 126 for reaction, there is a selectively engageable, multi-plate brake 130 which when engaged, connects ring gear 126 to the housing 26. This brake is operated by a hydraulically actuated piston 132 disposed adjacent to the end wall of the transmission housing to form a control chamber 133. The piston is movably mounted on an inwardly extending annular shoulder 134 and contacts the inner periphery of a Belleville spring 135. The chamber 133 formed between the piston and the end wall of the housing 26 is operatively connected to the hydraulic controls. The carrier 118 of planet gears 120 extends rearwardly and is splined to an output shaft 136 which is drivingly connected to the vehicle drive wheels by a suitable mechanism such as a drive differential.

The following schedule lists the engagement of the identified drive-establishing devices for the nine forward drives and three reverse drives listed below:

FRICTION DEVICES APPLIED (X)

| | 60 | 36 | 90 | 84 | 93 | 108 | 130 | Example ratio | Step |
|---|---|---|---|---|---|---|---|---|---|
| Range: | | | | | | | | | |
| 1 | X | | | X | | | X | 7.70 | |
| | | | | | | | | | −1.53 |
| 2¹ | X | | | X | X | | | 5.77 | |
| | | | | | | | | | −1.37 |
| 2 | X | X | | | | | X | 5.04 | |
| | | | | | | | | | −1.33 |
| 3¹ | X | X | | | | X | | 3.78 | |
| | | | | | | | | | −1.32 |
| 3 | X | X | | | | | X | 3.68 | |
| | | | | | | | | | −1.52 |
| 4 | X | X | | | | X | | 2.76 | |
| | | | | | | | | | −1.37 |
| 5 | X | | | X | X | | | 2.09 | |
| 6 | X | | X | | X | | | 1.37 | |
| 7 | X | X | | | X | | | 1.0 | |
| Reverse: | | | | | | | | | |
| 1 | | X | | X | | | X | 7.05 | |
| 2 | | X | | X | | X | | 5.29 | |
| 3 | | X | | X | X | | | 1.915 | |

¹ Optional.

As will be understood from the chart above, the transmission of this invention involves only four planetary gearsets and seven friction-drive-establishing devices to provide a large selection of input-to-output speed ratios with highly satisfactory and advantageous steps between adjacent ratios. The example ratios listed can be produced with the following gear tooth numbers:

Each ring gear has 67 teeth; sun gears 70 and 124 have 25 teeth each and sun gears 76 and 106 have 35 teeth each. With this gearing an overall ratio change of 7.70 to 1 is provided so that the transmission is suitable for on and off highway vehicles.

In first-range forward, clutch 60, brake 84 and brake 130 are applied. Under these conditions the turbine 16 drives ring gear 64; the planetary gearsets 40 and 66 compound to drive shaft 74 and the connected sun gear 124 of the rear gearset 122 at a predetermined speed-reducing ratio. This is a compound drive with part of the torque transmitted to shaft 74 through carrier 72 and part through ring gear 80. This torque split allows the front gear unit to be constructed with smaller and lighter components providing savings in weight and cost. Since brake 130 is applied to hold ring gear 126 of the planetary gearset 122, that gearset multiplies the torque of the front unit to produce the overall ratio of 7.70 listed in the chart above.

In an optional second-range forward, the front gearsets 66 and 40 are conditioned for reduction drive as described in connection with first range drive. In the rear gearsets brake 130 is released and brake 108 is applied. The planetary gearsets making up the rear unit act as a compound planetary gearset to produce a 2.76 speed reduction ratio and multiply front unit torque to produce an overall speed ratio in this drive of 5.77.

For second range forward, clutch 60 and brakes 90 and 130 are applied. Under these conditions the front planetary gear-gear 64 driven by the turbine and with sun gear 70 held for reaction by the brake 90. Using the tooth numbers listed above a 1.37 speed ratio is produced by the front gearset. The sun gear 124 of the rear gearset 122 is driven by carrier 72 and shaft 74. Under these conditions with brake 130 engaged the planetary gearset 122 multiplies torque delivered to sun gear 124 as described in connection with first range forward to produce an overall input-to-output ratio of 5.04.

In an optional third range, clutch 60 is applied and brakes 90 and 108 are applied; the front gear unit operates as described in connection with second range forward while the rear planetary gearsets compound as described in connection with optional second to produce an overall speed ratio of 3.78.

In third range clutches 36 and 60 are applied to lock up the planetary gearset 66 while brake 130 is applied to condition the planetary gearset 122 for torque multiplication as described in connection with the first range. Under these conditions the rear planetary gearset 122 provides the only torque multiplication and speed reduction in the gearing to produce a ratio of 3.68.

In fourth range, clutches 60 and 36 are applied to lock up the front gear unit as described in connection with third range to provide a speed ratio of 1.0. The rear gear units 100 and 122 are conditioned for torque multiplication by the engagement of brake 108 to produce a speed ratio as described in connection with the optional second range. Under these conditions the rear gear unit provides all of the geared torque multiplication and speed reduction to produce a ratio of 2.76.

In fifth range, drive clutches 60 and brake 84 are applied to condition the front gearsets 66 and 40 for a speed reduction ratio as described in connection with first range forward. The clutch 93 is applied to lock up the rear gear unit so that torque multiplication and speed reduction are accomplished by the front planetary gearsets compounding to produce the overall geared transmission ratio of 2.09.

In sixth range forward, clutch 60 and 90 are applied to condition the front gearset for reduction drive as described in connection with second range forward. The clutch 93 is applied to lock the rear gearsets for rotation as a unit to condition the transmission for an overall ratio of 1.37.

In seventh range, drive clutches 60 and 36 are applied to lock up the front gearsets for unitary rotation. Also the clutch 93 is applied to lock up the rear unit to provide a geared speed ratio of 1.

The steps between the ratios are calculated by dividing any smaller ratio into the adjacent larger ratio and the relatively even steps produced will provide for highly economical and smooth transmission operation with the torque properly matched with the varying requirement in hauling a load.

This transmission provides three reverse ranges with reverse being accomplished by engaging clutch 36 and brake 84. Under such conditions the turbine drives the sun gear 76 which in turn drives the ring gear 80 of the planetary gearset 40 in a reverse direction at a speed ratio of 1.915. To multiply these reverse torques, the brake 130 may be applied to condition the rear gearsets for the largest torque-multiplying ratio. An intermediate torque-multiplying ratio may be employed by engaging brake 108 and the lower reverse ratio may be produced by locking up the rear unit by engaging clutch 93.

FIG. 2 diagrammatically illustrates the invention in a slightly modified form in which the positions of the gearsets 100 and 122 of FIG. 1 have been interchanged. The same reference numerals are utilized in FIGS. 1 and 2 to identify corresponding parts and the two embodiments are functionally the same. The schedule above illustrates the engagement of the friction drive establishing devices to produce the nine forward and three reverse drives.

The above description of a preferred embodiment of the invention is for illustration purposes and other embodiments will now become readily apparent. Accordingly, this invention is drawn to the embodiments covered by the following claims:

What is claimed is:

1. A power transmission comprising rotatable input and output means operatively connected by first and second drivingly connected gear units conditionable to provide a plurality of forward drive ratios and a plurality of reverse drive ratios, said first gear unit being solely provided by first and second operatively connected planetary gearsets forming a compound unit with first and second power paths, each of said gearsets having a sun gear and a ring gear operatively connected by planet gear means and a carrier for said planet gear means, drum means operatively connected to said input means for continuous rotation thereby, gear means fixed to the outer periphery of said drum means providing a power takeoff, a first selectively engageable clutch engageable to drivingly connect said input means to said ring gear of said first gearset, first selectively engageable brake means operatively connected to said second gearset engageable to condition said front gear unit for a forward drive reduction ratio with power flowing through first and second paths provided by said first gear unit into said second gear unit, a second selectively engageable brake means operatively connected to said first gearset to condition said front gear unit for another forward drive reduction ratio with power flowing only through said first path of said first gear unit into said second gear unit, and a second selectively engageable clutch engageable completely housed within said drum means to drivingly connect said sun gear of said second gearset to said input to provide for a reverse drive speed reduction ratio when only said first brake means is additionally engaged, said second gear unit having third and fourth operatively connected planetary gearsets, third selectively engageable brake means to condition said second planetary gear unit for a first reduction drive of said output means by the compound action of said third and fourth gearsets, fourth selectively engageable brake means to condition said fourth planetary gearset for a second reduction drive of said output means, and single clutch means selectively engageable for locking said second gear unit for direct drive operation.

2. The power transmission of claim wherein said single clutch means is a third selectively engageable clutch for drivingly connecting one of said ring gears with one of said sun gears of said second gear unit for locking said third and fourth planetary gearsets for a direct drive, said third planetary gearset having a carrier drivingly connected to the ring gear of said fourth planetary gearset, said third planetary gearset further having a sun gear drivingly connected to said carrier of said fourth planetary gearset and to said output means.

3. The power transmission of claim 1, wherein said single clutch means is a selectively engageable clutch for drivingly connecting one of said ring gears with one of said sun gears of said second gear unit for locking said third planetary gearset for a direct drive, said third planetary gearset having a ring gear drivingly connected to the carrier of said fourth planetary gearset and having a carrier drivingly connected to the sun gear of said fourth planetary gearset and to said output means.

4. A power transmission comprising rotatable input and output means operatively connected by front and rear drivingly connected gear units conditionable to provide a plurality of forward drive ratios and a plurality of reverse drive ratios, said front gear unit being provided by first and second operatively connected planetary gearsets each having a sun gear and a ring gear operatively connected by planet gear means and having a carrier for said planet gear means, a first selectively engageable clutch engageable to drivingly connect said input to said ring gear of said first gearset, first selectively engageable brake means operatively connected to said carrier of second gearset engageable to condition said front gear unit for a forward drive reduction ratio with power flowing through first and second paths in said front gear unit into said rear gear unit, second selectively engageable brake means operatively connected to said sun gear of said first gearset to condition said front gear unit for another forward drive reduction ratio with power flowing only through said first path in said front gear unit into said rear gear unit, a drum operatively connected to said input for rotation therewith, power takeoff gear means formed on said drum means, a second selectively engageable clutch disposed within said drum and engageable to drivingly connect said sun gear of said second gearset to said input to provide for a reverse drive speed reduction ratio when only said first brake means is additionally engaged, said rear gear unit having third and fourth operatively connected planetary gearsets, each of said last-mentioned gearsets having a sun gear and a ring gear connected by planet gear means and having a carrier for said planet gear means, said carrier of said fourth gearset being directly connected to said sun gear of said third gearset and to said transmission output means, said carrier of said third planetary gearset being directly connected to said ring gear of said fourth gearset, third selectively engageable brake means operatively connected to said ring gear of said third gearset to condition said third and fourth planetary gearsets for cooperative drive of said transmission output means, fourth selectively engageable brake means operatively connected to said ring gear of said fourth planetary gearset to condition said fourth planetary gearset for the drive of said transmission output means, and single clutch means operatively connected to one of said sun gears and one of said ring gears of said third and fourth gearsets and engageable to lock said third and fourth gearsets for rotation as a unit for the direct drive of said transmission output means.

* * * * *

PO-1050
(5/69)

UNITED STATES PATENT OFFICE
CERTIFICATE OF CORRECTION

Patent No. __3,678,783__       Dated __July 25, 1972__

Inventor(s) __John J. O'Malley and Marion D. Smith__

It is certified that error appears in the above-identified patent and that said Letters Patent are hereby corrected as shown below:

In the Abstract, "evenly-steeped" should read -- evenly-stepped --;

Column 1, line 74, "contracts" should read -- contacts --;

Column 2, line 4, after "is" insert -- a --;

Column 3, line 76, after "gear-" insert -- set 66 operates alone as a simple planetary gearset with ring --;

Column 4, line 39, after "and" insert -- brake --;

Column 5, line 37 (Claim 2) after "claim" insert -- 1 --.

Signed and sealed this 9th day of January 1973.

(SEAL)
Attest:

EDWARD M. FLETCHER, JR.
Attesting Officer

ROBERT GOTTSCHALK
Commissioner of Patents